United States Patent [19]
Oosterling et al.

[11] 4,091,603
[45] May 30, 1978

[54] DEVICE FOR COMPRESSING AGRICULTURAL CROP INTO A BUNCH

[75] Inventors: Pieter Adriaan Oosterling; Hendrik Vissers, both of Nieuw-Vennep, Netherlands

[73] Assignee: Vicon N.V., Nieuw-Vennep, Netherlands

[21] Appl. No.: 616,201

[22] Filed: Sep. 24, 1975

[30] Foreign Application Priority Data

Sep. 27, 1974 Netherlands .......................... 7412864

[51] Int. Cl.² ............................................. A01D 87/04
[52] U.S. Cl. ........................................ 56/346; 100/35; 100/188 R; 214/508; 214/520
[58] Field of Search ................... 100/35, 42, 232, 209, 100/188, 189; 56/341–346; 214/508, 518, 520, 522

[56] References Cited
U.S. PATENT DOCUMENTS

| | | | |
|---|---|---|---|
| 165,252 | 7/1875 | Pike | 100/188 R |
| 2,233,111 | 2/1941 | Roberts | 214/508 |
| 3,894,646 | 7/1975 | Head et al. | 214/522 |
| 3,934,394 | 1/1976 | Garrison | 56/344 |

*Primary Examiner*—Peter Feldman
*Attorney, Agent, or Firm*—Snyder, Brown & Ramik

[57] ABSTRACT

Apparatus is disclosed for baling a crop. The crop is fed into the top of a holder and a pair of compressing members are alternately actuated to compress the crop as it is progressively accumulated. Each member compresses all of the crop underlying it and maintains a predetermined compression until after the other member comes into operation. The compression members are in the form of rakes having tines which are projected and withdrawn through opposite side walls of the holder.

13 Claims, 5 Drawing Figures

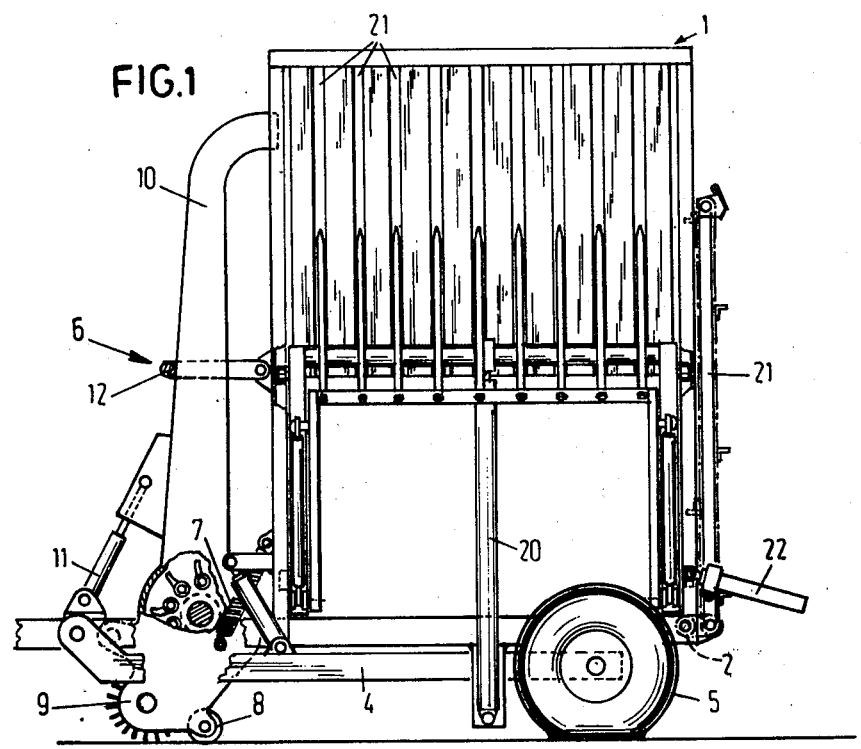
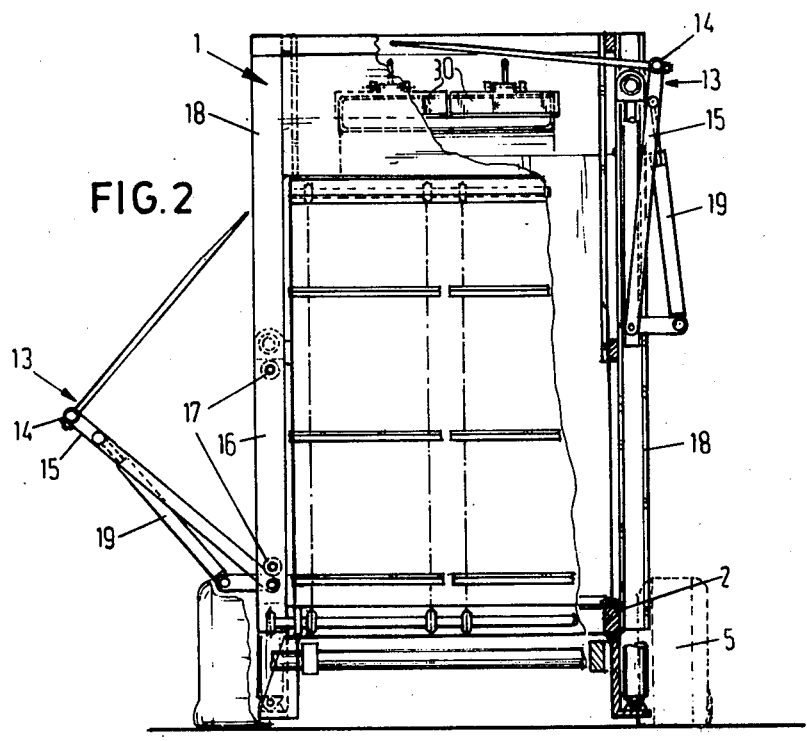

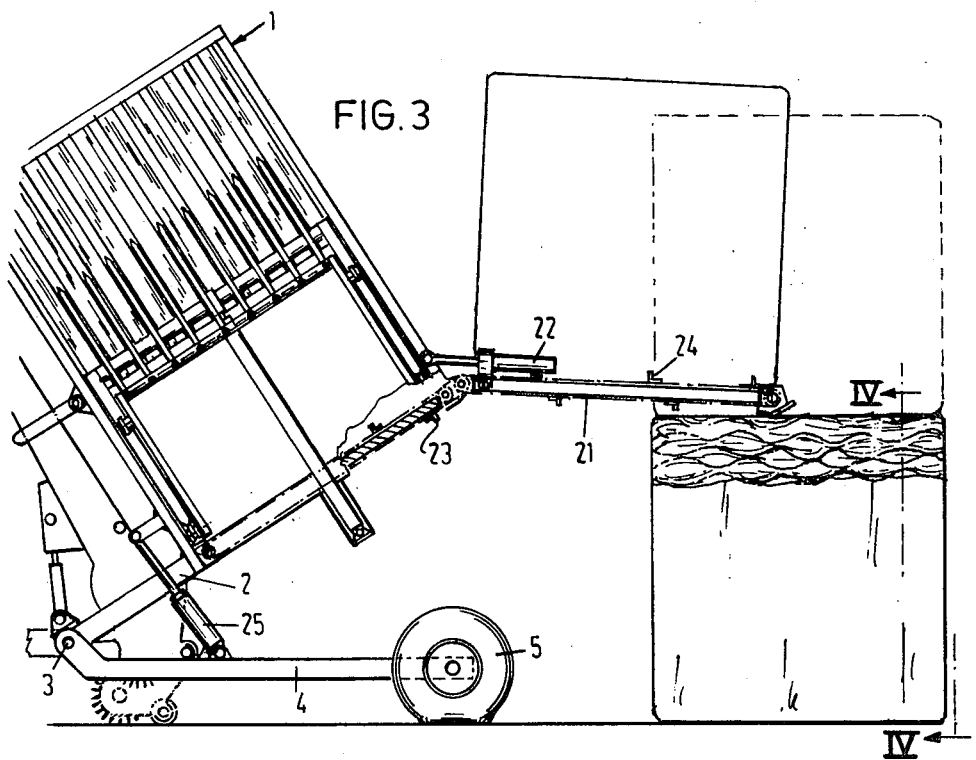
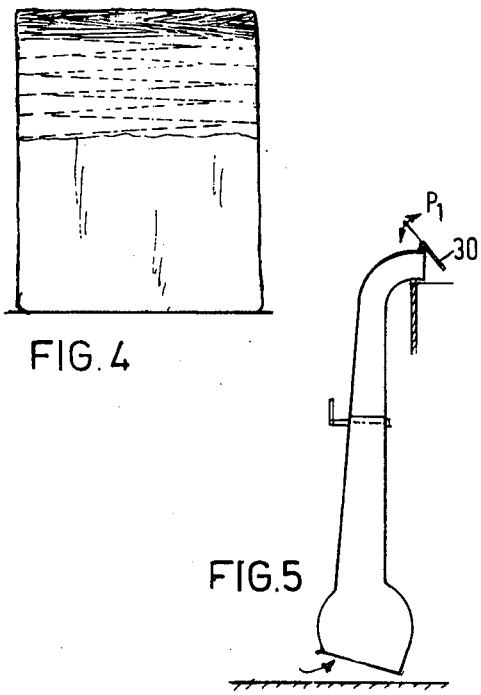

DEVICE FOR COMPRESSING AGRICULTURAL CROP INTO A BUNCH

The invention relates to a device for collecting a quantity of crop in a compressed bunch after said crop has been picked up from the ground and passed into a holder.

The invention has for its object to carry out such a baling operation in steps so that a quantity of crop once compressed can no longer expand.

Although it is possible to separate each compressed partial quantity from the holder and to join these quantities outside the holder, it is advantageous in accordance with the invention to carry out the entire baling cycle within the holder and to subsequently remove the ready bale from the holder.

The device according to the invention is characterized by at least two compressing members each having a driving means adapted to be controlled so that the compressing members can be alternately operative. This device thus permits of first compressing a partial quantity by one compressing member and of subsequently compressing the next partial quantity by the other compressing member and, when the desired compressing force is attained one compressing member can be withdrawn and be employed for the third partial quantity and so on.

A particularly simple embodiment is obtained when the holder itself is constructed in the form of a compression space, that is to say, when each pair of compressing members can be moved towards and away from a pressure wall of the holder. Thus the compression of each partial quantity of crop takes place between the compressing member and a pressure wall of the holder. If more than one compressing member is available, each pair of them will preferably co-operate with an individual pressure wall of the holder.

In a preferred embodiment of the invention the compressing members are shaped in the form of rakes. The tines of a compressing member or of a pair of compressing members may be arranged in different ways and one possible disposition will be described more fully hereinafter.

According to the invention the holder is equipped with conveying means for removing the compressed bale of crop from the holder. For this purpose the bottom may be provided with a conveying member acting towards an outlet opening in the holder. The outlet opening is preferably formed by a tiltable wall pivotable about its edge engaging the bottom so that the compressed bale can be delivered at different levels behind the device.

In order to increase the attainable height the holder can be pivotally arranged on a supporting frame so that the bales of compressed crop can be piled up.

Moreover, the supporting frame may be mobile, it then being preferred to provide the holder with the frame also with a pick-up and conveying means for picking up the crop from the ground and feeding the same from above into the holder. This combination provides a universal device for the formation of compressed bunches of crop, during which compression the device can continue picking up crop from the ground so that the gathering time is considerably reduced. This may be particularly advantageous under certain weather conditions. The device need only be stopped for delivering each desired bunch of crop out of the holder.

Further features and objects of the invention will be described more fully hereinafter with reference to a preferred embodiment of the invention. In the drawing:

FIG. 1 is a side elevational view of the device in accordance with the invention, arranged on a mobile frame and provided with pick-up and conveying means, FIG. 2 is a rear view of the device shown in FIG. 1, FIG. 3 is a side elevational view of the device like FIG. 1 however, in a position suitable for piling up bunches of crop.

FIG. 4 is a schematic sectional view of a bunch of crop in which the compressed partial quantities of the whole bunch are shown, FIG. 5 is a side elevational view of the pick-up and conveying means of FIG. 1.

In the Figures reference numeral 1 designates the holder of a press and 2 the frame supporting said holder 1 and pivoted by the hinge 3 to the main frame 4. The main frame 4 is provided at the rear end with ground wheels 5, whereas at the front end (not shown) it can be attached to a tractor or the like.

At the front of the holder 1 a pick-up and conveying means 6 is suspended by means of the springs 7 to the holder 1 and bears on the ground by its own guide wheel or roller 8. Owing to the movable suspension of the pick-up and conveying means 6 with respect to the holder 1 and hence with respect to the supporting frame 4 the conveying means can readily follow the unevennesses of the ground.

The pick-up and conveying means 6 mainly comprises a rotatable pick-up member 9 equipped with radial pins, which gathers the crop during its clockwise rotation (see FIG. 1) and transfer it to a rapidly rotating rotor, which elevates the crop by centrifugal effect in the elevator pipe 10 and delivers it on top in the holder. The elevator pipe 10 can be tilted rearwardly to a greater or lesser extent by means of the piston/cylinder 11, the foremost position being limited by a stop 12 secured to the holder 1.

The compressing mechanism proper is formed by two compressing members 13 arranged one on each side of the holder 1 and adapted to co-operate with the bottom of the holder 1. Each compressing member has a rake-like part, the tines 14 of which are fastened at equal intervals to a beam 14 extending along the side of the holder 1 and secured at its ends to posts 15. The lower end of each post 15 is pivotally coupled with a slide 16, which is adapted to move up and down in a vertical guide by means of wheels 17. The vertical guide is formed by channel-section profiles 18 arranged near the corners of the holder 1 so that their flanges face one another.

The rake-like members 13 are adapted to tilt outwardly around the hinge at the lower end of the post 15, said tilting movement being performed by means of a piston/cylinder 19. The upward and downward movement of the slide 16 is performed by the piston/cylinder 20.

Each tine of the compressing member 13 travels in a vertical slot 21 in the sidewalls of the holder 1.

Compressing the crop fed into the holder 1 into a bunch is performed as follows:

When the tractor draws the device across the field, the pick-up and conveying means 6 will blow the crop on top into the holder 1, the crop then dropping to the bottom of the holder. At this instant the two compressing members 13 are in the outwardly tilted position indicated in FIG. 2 on the left-hand side. When a sufficient quantity of crop has been blown into the holder 1, one of the compressing members 13 is urged upwards by means of the piston/cylinder 20 and in the inward direction so that the tines project through the slots 21. This position is shown for the compressing member 13 on the right-hand side in FIG. 2. Subsequently the compressing member 13 on the slide 16 is moved downwards with the aid of the piston/ cylinder 20, compressing the crop between the rake 13 and the bottom of the holder 1. The feed of the crop can take place simultaneously, so that the tractor need not be stopped. At a given compressing force depending upon the pressure in the hydraulic driving system the rake-like compressing member stops and when an adequate quantity of crop is fed on top of the operative rake the compressing member 13 will first be lifted in an outwardly tilted position, after which it is tilted inwardly and again moved downwards until equality of compressing force is attained. Then the first compressing member can be drawn outwards, and in the outwardly tilted position it is moved upwards, tilted inwardly and moved downwards. This working cycle can be repeated until the desired bunch of compressed crop is obtained. Such a bunch is shown in a cross sectional view in FIG. 4, in which the broken lines mark the quantity compressed per cycle by the rake-like member 13.

The delivery of a compressed bunch of crop is shown in detail in FIG. 3. For this purpose the holder 1 has an outwardly tiltable wall 21 on the rear side.

At the edge joining the bottom this wall 21 is hinged to said bottom. The pivotal movement is performed by means of a piston/cylinder 22. It will be obvious that by tilting the wall 21 outwardly about the hinge the bunch can be removed out of the holder 1. Removal is preferably performed by means of a conveying means arranged in the bottom of the holder 1, in this case a chain conveyor 23 running in synchronism with a chain conveyor 24 arranged around the outwardly tiltable wall 21.

FIG. 3 shows that by arranging the holder 1 on a separate, pivotable frame 2, whose pivotal movement about the hinge 3 is performed by means of a piston/cylinder 25 the compressed bunches can be stacked up. When a stack is ready, it can be delivered by tilting the wall 21 directly down to the ground. However, if the next bunch has to be piled up on the first, the supporting frame 2 is turned upwards and the free end of the outwardly tiltable wall 21 is put down on the top side of the first bunch delivered. Subsequently, the conveyors are actuated and the new bunch can be pushed onto the first, which is indicated by broken lines in FIG. 3.

Since for the alternating operation of the compressing members 13 a distribution of the crop fed into the holder 1 is important, the outlet end of the elevator pipe 10 can be changed in position.

In the side elevational view of FIG. 5 of the pick-up and conveyor means 6 the outlet end of the elevator pipe 10 is provided with a flap 30. By swinging the flap upwards in the direction of the arrow P1 to a greater or lesser extent, the flow of elevated crop can be introduced to a greater or lesser extent back into the holder 1. By using, for example, two flaps side by side, the left-hand or the right-hand half respectively of the space in the holder can be filled.

As a matter of course, within the scope of the invention other embodiments are possible. The compressing members may have a construction differing from that of a rake; there may be designed two plates operating side by side from top to bottom by means of a plunger.

The direction of compression may differ from the vertical direction shown.

The compressing device may be arranged so as to be stationary, in which case the feed is performed by other means than the elevator means shown. Moreover, combinations of the various parts are possible. The conveying means in the bottom may be combined with the compressing members, the latter delivering the compressed bunch out of the holder 1.

What is claimed is:

1. Apparatus for compressing a large quantity of crop into a bunch, comprising in combination:
   a holder having a floor and upstanding side wall portions surrounding said floor;
   means for feeding the crop into said holder to accumulate therein;
   first and second compressing means for alternately but overlappingly compressing the crop to form said bunch as the crop is progressively accumulated in said holder, and including drive means for causing said first compressing means to maintain a predetermined compression force on a partially accumulated bunch while said second compression means is establishing compression on further accumulated crop and until said second compressing means has compressed said further accumulated crop and said partially accumulated bunch to exert said predetermining compression force thereon, and vice versa, whereby continuously to maintain said predetermined compression force on all of the crop so accumulated and compressed; and
   means for discharging compressed crop from the holder as said bunch when said large quantity has been accumulated and compressed.

2. Apparatus as defined in claim 1 wherein said first and second compressing means are disposed on opposite sides of said holder.

3. Apparatus as defined in claim 2 wherein said opposite sides of the holder are slotted to allow vertical movements of said compressing means.

4. Apparatus as defined in claim 3 wherein each compressing means is in the form of a rake and said drive means includes first driving means for projecting and withdrawing the teeth of the rake through its associated slotted side wall and second drive means for urging said rake toward said floor of the holder.

5. Apparatus as defined in claim 4 including guide means on each of said side walls of the holder for slidably guiding a respective compressing means.

6. Apparatus as defined in claim 5 wherein said means for discharging comprises a conveyor on said floor of the holder.

7. Apparatus as defined in claim 6 wherein said means for discharging also includes a conveyor on the inner side of a side wall of the holder and means for tilting such side wall outwardly.

8. Apparatus as defined in claim 7 including a wheel-supported frame carrying said holder, said means for feeding comprising conveyor means for picking up cut crop and feeding it into said holder.

9. Apparatus as defined in claim 8 wherein said conveyor means includes a ground-engaging portion movably carried by said frame for independent vertical movement with respect thereto so as closely to follow the ground surface, and being movable to an elevated, transport position.

10. Apparatus as defined in claim 8 including means pivotally mounting said holder on said frame for tilting motion relative thereto whereby to elevate that side wall which tilts outwardly.

11. Apparatus as defined in claim 4 wherein each second driving means is a hydraulic mechanism whereby the crop compressive force of each second driving means is maintained until the crop compressive force of the other second driving means is obtained so that said predetermined compression force is maintained continuously as aforesaid.

12. Apparatus as defined in claim 1 including a wheel-supported frame carrying said holder, said means for feeding comprising conveyor means for picking up cut crop and feeding it into said holder.

13. Apparatus as defined in claim 12 including means for pivotally mounting said holder on said frame for tilting motion relative thereto, said means for feeding including a discharge portion movable with said holder.

* * * * *